Aug. 26, 1941.   G. L. CLICKNER   2,253,845
CAMSHAFT BEARING TOOL
Filed March 2, 1939
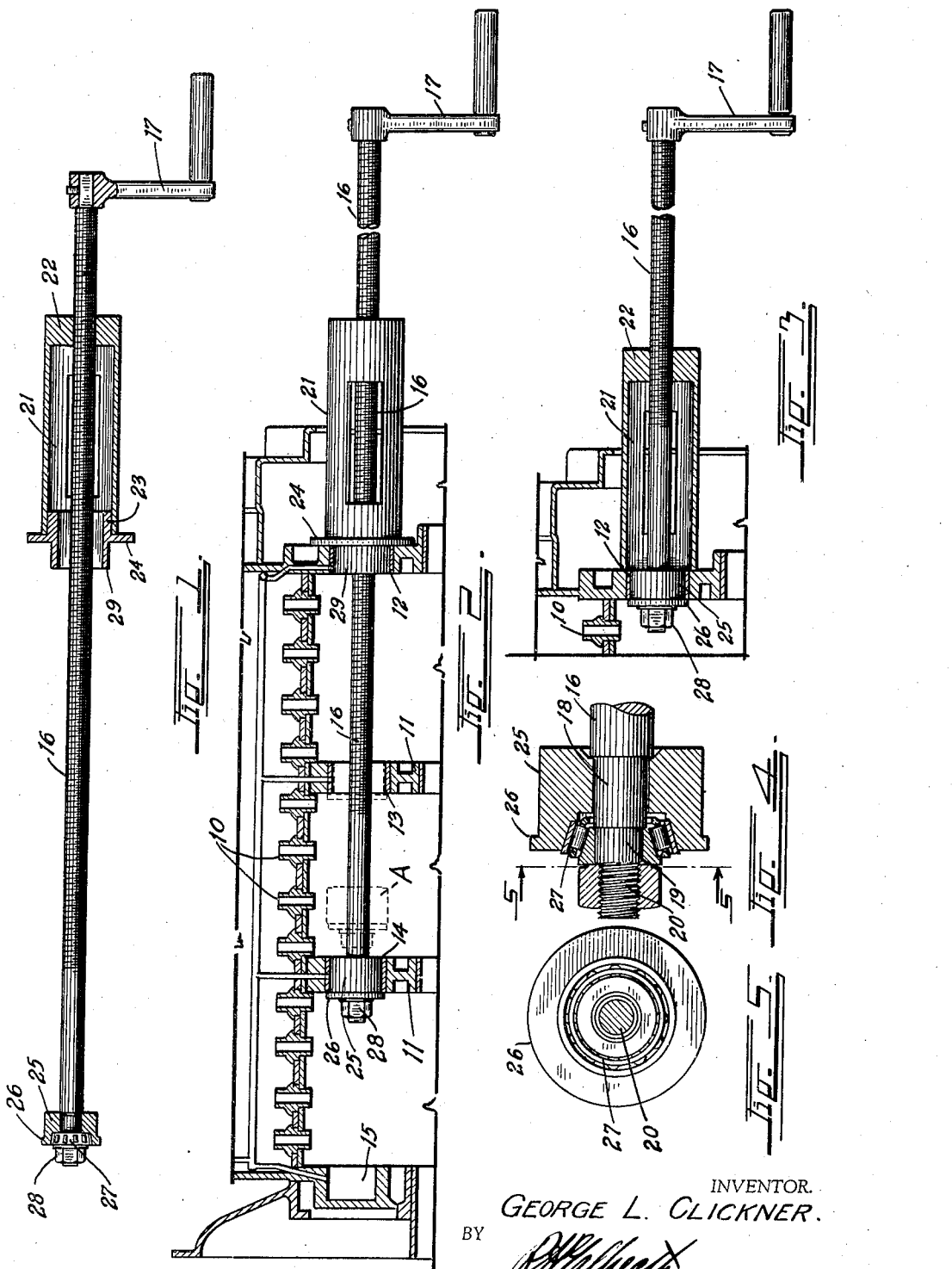
INVENTOR.
GEORGE L. CLICKNER.
BY
ATTORNEY.

Patented Aug. 26, 1941

2,253,845

UNITED STATES PATENT OFFICE 2,253,845

CAMSHAFT BEARING TOOL

George L. Clickner, Casper, Wyo.

Application March 2, 1939, Serial No. 259,373

1 Claim. (Cl. 29—88.2)

This invention relates to a tool for removing and replacing the cam shaft bearing bushings in the modern automobile engine.

In modern engines exceedingly thin cylindrical bearing sleeves are used as bushings for carrying the cam shaft. These sleeves are so thin and delicate that it is difficult to remove and replace them without damage to the bearing sleeves and the surrounding housing.

The usual procedure is to drive the sleeves from place and to drive the new sleeves into place. By such a method, it is impossible to bring the new sleeves into a perfect cylinder and into perfect axial alignment. It is therefore necessary to rebore the sleeves after they have been driven into place. The principal object of this invention is to provide an accurate precision tool which can be used both for removing and replacing the bushings easily and accurately so that the cam shaft may be immediately placed therein without a preliminary reboring.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a longitudinal sectional view of the improved cam shaft bearing sleeve tool.

Fig. 2 is a side elevation of the tool illustrating it in place in a typical engine block.

Fig. 3 is a detail view illustrating the position of the tool when operating upon the front bearing sleeve of an engine.

Fig. 4 is a detail cross section through a bearing mandrel as used on the tool and its associate parts.

Fig. 5 is a cross section taken on the line 5—5, Fig. 4, showing an end view of the bearing mandrel and its thrust bearing.

In Fig. 2 a portion of a typical engine block is illustrated with its valve tappet guiders at 10, its cam shaft bearing pillars at 11 and cam shaft bearing bushings or sleeves at 12, 13, and 14. The inner extremity of the usual engine cam shaft is positioned in an aligning socket 15 that is not provided with a bearing bushing.

The improved bearing bushing removing and replacing tool employs a threaded shaft 16, of sufficient length to extend into the cam shaft housing beyond the inner-most bearing bushing therein. The outer extremity of the shaft 16 terminates in a crank 17. The inner extremity is shouldered as is shown at 18 and 19 and terminates in a threaded end 20. The shaft 16 extends through a cylindrical supporting housing 21, one extremity of which is closed by means of a head 22 through which the shaft 16 is axially threaded. The open extremity of the housing 21, fits over a guide collar 23 provided with a peripheral flange 24 and a tubular extremity 29.

The first shouldered portion 18 of the shaft receives a bearing mandrel 25 formed with an annular flange 26 adjacent one of its faces. The latter face is taper counterbored to receive a removable tapered roller thrust bearing 27 which is held in place therein by means of a nut 28 on the threaded end 20. Since the bearing bushings in various engines vary in diameter and since the bearing bushings even in the same engine vary in diameter to facilitate the removal and replacement of the cam shaft, a plurality of the bearing members 25 of differing diameter are furnished with the tool.

Let us assume that it is desired to remove the bearing bushings 12, 13, and 14 from the engine block of Fig. 2. The nut 28, the bearing 27, and mandrel 25 are removed from the end of the shaft 16. The shaft is then inserted completely through the bearings 12, 13, and 14, and the extremity 29 of the guide collar is inserted into and seated accurately within the first bearing bushing 21 so as to support the shaft 16 in axial alignment.

A mandrel 25 of the proper diameter for the bearing 14 is now placed on the extremity of the shaft, the thrust bearing 27 is put into place, and the nut 28 tightened. The crank 17 is now rotated to thread the shaft outwardly, thus bringing the mandrel into the bushing 14 with the flange 26 against the entire peripheral face thereof. Continued rotation of the shaft draws the bushing from place as indicated in broken line at A. The mandrel 25 and bushing are now removed and replaced by a larger one to fit the bushing 13 and the process is repeated. The guide collar is now removed from the housing 21 and the next larger mandrel to fit the bushing 12 is placed on the shaft. Rotation of the latter now draws the last bushing 12 into the hollow interior of the housing 21 as shown in Fig. 3.

To replace the bushings, the above procedure is substantially repeated. However, in replacing the bushings, the new bushing is placed on its proper mandrel 25 and brought against the inner face of its bearing pillar 11. It is then drawn into place by rotation of the shaft 16.

The flanges 26 on the mandrels 25 are but slightly smaller than the extreme diameter of the bushing to which they are to be applied so that an even pressure is brought against the entire periphery of the bushing while it is being drawn into place. This even pressure is insured by the fact that the guide collar 23 always maintains the shaft 16 in perfect axial alignment. The bushings cannot flatten or distort while being drawn into place since they fit snugly.

The bushings are not scratched, grooved, or scored due to the fact that the mandrels remain stationary therein while the shaft is free to rotate against the thrust bearing 27. This allows the oil holes in the bushing 14 to be aligned with the oil holes in the engine block before insertion with full assurance that they will not rotate from this position while being drawn in place.

Windows 30 are formed in the sides of the housing 21 through which the progress of removing or resetting the bushing 12 may be observed.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A device for removing and replacing crank shaft bearing bushings in automotive engines comprising: a threaded shaft; rotating means on one extremity of said shaft; a shoulder formed on said shaft adjacent its other extremity; a cylindrical mandrel on said latter extremity with one face resting against said shoulder, there being a bearing socket in the other face of said mandrel; a flange about the latter face of the mandrel; a thrust bearing in said bearing socket; a nut on the extremity of said shaft clamping said thrust bearing in said socket and holding said mandrel against said shoulder; a hollow housing surrounding said shaft intermediate its extremities and threaded thereon; a closed end in said housing through which said shaft is threaded; a guide member telescopically fitted into the open end of said guide member and acting to limit its insertion into said housing; and a sleeve projecting outwardly from said flange for insertion in a bearing bushing for concentrically aligning said housing and shaft therewith.

GEORGE L. CLICKNER.